United States Patent
Madhavan et al.

(10) Patent No.: US 8,190,510 B2
(45) Date of Patent: *May 29, 2012

(54) SYSTEM AND METHOD FOR ESTIMATING AND OPTIMIZING TRANSACTION COSTS

(75) Inventors: Ananth Madhavan, New York, NY (US); Artem V. Asriev, Winchester, MA (US)

(73) Assignee: ITG Software Solutions, Inc., Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/170,626

(22) Filed: Jun. 28, 2011

(65) Prior Publication Data

US 2011/0258107 A1  Oct. 20, 2011

Related U.S. Application Data

(63) Continuation of application No. 10/166,719, filed on Jun. 12, 2002, now Pat. No. 7,974,906.

(51) Int. Cl.
*G06Q 40/00* (2012.01)

(52) U.S. Cl. .......................................... 705/37; 705/35

(58) Field of Classification Search ............... 705/35–45
See application file for complete search history.

(56) References Cited

U.S. PATENT DOCUMENTS

| | | | |
|---|---|---|---|
| 5,544,355 A | 8/1996 | Chaudhuri et al. | |
| 6,112,189 A | 8/2000 | Rickard et al. | |
| 6,349,291 B1 | 2/2002 | Varma | |
| 6,564,191 B1 | 5/2003 | Reddy | |
| 7,149,713 B2 | 12/2006 | Bove et al. | |
| 2001/0042035 A1* | 11/2001 | Kelly et al. | 705/36 |
| 2002/0035533 A1 | 3/2002 | Mache et al. | |
| 2002/0103732 A1 | 8/2002 | Bundy et al. | |
| 2002/0138383 A1 | 9/2002 | Rhee et al. | |
| 2002/0174045 A1 | 11/2002 | Arena et al. | |

OTHER PUBLICATIONS

Trading systems.(Buyers Guide) Derivatives Week, v 14, n 26, p. S10(10) Jul. 4, 2005 ISSN: ISSN: 1075-2412.*

* cited by examiner

*Primary Examiner* — Richard C Weisberger
(74) *Attorney, Agent, or Firm* — Rothwell, Figg, Ernst & Manbeck, P.C.

(57) ABSTRACT

A method and system for forecasting the transaction cost of a portfolio trade execution that may be applied to any given trade strategy or an optimal trade strategy that minimizes transaction costs. In preferred embodiments, a server comprises one or more computers that act as an automated forecaster whereby it accepts user-defined input variables from customers and generates a transaction cost estimation report based on those variables. The server is programmed with specific transaction cost estimation and optimization algorithms that model the transaction costs of a specific trade execution based on the user's trading profile and market variables.

14 Claims, 2 Drawing Sheets

SYSTEM AND METHOD FOR ESTIMATING AND OPTIMIZING TRANSACTION COSTS

This application is a Continuation of and claims priority to U. S. patent application Ser. No. 10/166,719, filed Jun. 12, 2002, the entire contents of which are incorporated herein by reference in their entirety.

FIELD OF THE INVENTION

This invention relates generally to securities markets, and more particularly relates to a system and method for estimating the transaction costs of a trade execution and developing an optimized trading strategy for securities in advance of trading.

BACKGROUND OF THE INVENTION

Securities portfolio transactions typically incur transaction costs arising not only from commissions and bid-offer spreads, but also from price movements (market impact) associated with execution. Execution costs can be large, especially when compared against gross returns, and might substantially reduce or even eliminate the notional returns to a particular investment strategy.[1] A large body of research (Keim and Madhavan (1998) provide a survey) shows that market or price impact is a major component of total trading cost. Consequently, minimization of transaction costs has been a long-standing aim, especially for traders handling portfolio transactions; e.g., transactions that rebalance securities positions in a portfolio over a specified period of time. A related goal is to develop optimal trading strategies to minimize trading costs or some other objective criterion.

For an equally weighted global portfolio of stocks, turned over twice a year, such costs alone account for 23 percent of returns over recent history. See Domowitz, Glen, and Madhavan, "Liquidity, Volatility, and Equity Trading Costs Across Countries and Over Time," working paper, Pennsylvania State University, January, (2001) for discussion, analysis, and precise definitions of cost.

To this end, statistical and mathematical models have been developed in an attempt to forecast the transaction costs of a proposed portfolio trade execution. These models typically build on some known empirical facts about trading costs. For example, empirical studies have established that costs increase in trade difficulty, a factor systematically related to order size (relative to average trading volumes), venue (e.g., Exchange Listed Trades vs. Over The Counter ("OTC")), trade direction (Buys vs. Sells), firm size (Market Capitalization), Risk (e.g., the volatility of security returns), and price level. In addition, costs are also systematically related to trading style, as reported by Keim and Madhavan (1998). Traders who trade passively (using limit orders and spreading their trades over a long period of time) incur lower costs, on average, than traders who trade more aggressively using market orders to demand immediacy. Two otherwise identical orders might have very different trading costs depending on how a trader presents them to the market. See Madhavan (2000) for details.

Of the many statistical and mathematical forecasting models developed, most suffer from the inability to perform comprehensive analyses of transaction costs because the level of trade difficulty and the impact of trading style (e.g., horizon over which trading takes place) is not analyzed or not accurately analyzed. Therefore, there is a need in the field to include in a forecasting model an adjustment factor that accurately accounts for trade difficulty and market conditions, allowing for a valid comparison of trades executed in different circumstances and trading conditions. It is important that this system accommodate parameters for trading style. Since the trader's style is closely related to their ultimate objectives (e.g., a value trader might trade passively over several days to minimize price impact costs, tolerating the risk of adverse price movements in the interim), this creates a need for a model that ties strategy to a trader's subjective assessment of risk. In particular, there is a need in the field to provide a model that would recommend an optimal trading strategy to a trader based on the trader's risk tolerance and other considerations such as the horizon over which the trade is to be completed. In order to meet these needs and to overcome deficiencies in the field, the present invention enables portfolio traders to forecast the transaction costs of a proposed trade execution based on a user-selected trading style and inputs pertaining to order characteristics and trade difficulty. The invention also provides an optimized trading strategy to satisfy user-defined constraints.

SUMMARY OF THE INVENTION

The present invention provides a system for forecasting the price impact costs of a trade execution that may be applied to any given trade strategy.

The present invention provides an Agency Cost Estimator ("ACE") method and system comprising two parts: a first part that comprises computer-based models that allow a user to obtain price impact cost estimates for any pre-specified strategy, and a second part that comprises computer-executed mathematical models that generate an optimal trading strategy subject to certain assumptions about the user's ultimate objectives.

In another aspect of the present invention, a server comprises one or more computers that act as an automated forecaster whereby a computer accepts a user-specified trade strategy and input variables from a customer and generates a transaction cost analysis or estimation based on those variables and market data. The server is programmed with specific transaction cost analysis and optimization algorithms that model the transaction costs of a proposed trade execution based on the user's risk aversion profile, characteristics of the proposed trade execution, and market variables. The servers may be connected to a plurality of customers over a communication network, such as the Internet, and customers enter their strategy profile and hypothetical trade order characteristics through the communication network to the server associated with transaction cost optimization. In yet another aspect of the present invention, the transaction cost analysis web site allows a user to perform inquires and calculations in real-time. According to another aspect of the present invention, the transaction cost analysis process is adapted to provide a direct interface to a securities price database to enable the display of transaction cost analysis results in "real-time."

In another aspect of the present invention, the transaction cost analysis allows for intra-day calculation of price-based benchmarks.

According to another aspect, the invention provides a method for estimating and/or optimizing transaction costs for a proposed trade order for a security. The method comprises the steps of providing a server connected to a communication network, the server being programmed with a specific transaction cost optimization and/or estimation algorithm; receiving at the server over the network a proposed trade order from a customer; calculating the estimated transaction costs for the proposed order according to the specific trading strategy of the customer and the transaction cost estimation algorithm; and providing an estimation report to the customer over the network.

In preferred embodiments of the present invention, multiple servers may be deployed where each server accepts proposed orders and other customer input data directly over the communication network from customers wishing to estimate the transaction costs of one or more securities to be traded according to the particular trading strategy set by the customer. All servers have access to multiple trading destinations, access to real-time and historical market data, and real-time analytic data. Furthermore, each server has access to other servers on the communication network such that market and historical data, or compilations of data, can be exchanged between the servers, and the servers can interoperate more efficiently. The user can edit or modify the proposed trading strategy received from the cost estimator, then send the resulting trade list to a trading venue or to an automated trading system such as ITG Inc's VWAP Smart Server.

The present invention will become more fully understood from the forthcoming detailed description of preferred embodiments read in conjunction with the accompanying drawings. Both the detailed description and the drawings are given by way of illustration only, and are not limitative of the present invention.

DETAILED DESCRIPTION OF THE INVENTION

The present invention embodies a transaction cost estimation method and system comprising a first part having computer-based price impact and volatility models that allow a user to obtain transaction cost estimates for any given strategy, and a second part comprising computer-executed mathematical models that generate an optimal strategy based on certain assumptions and the results of the first part.

Figure 1:
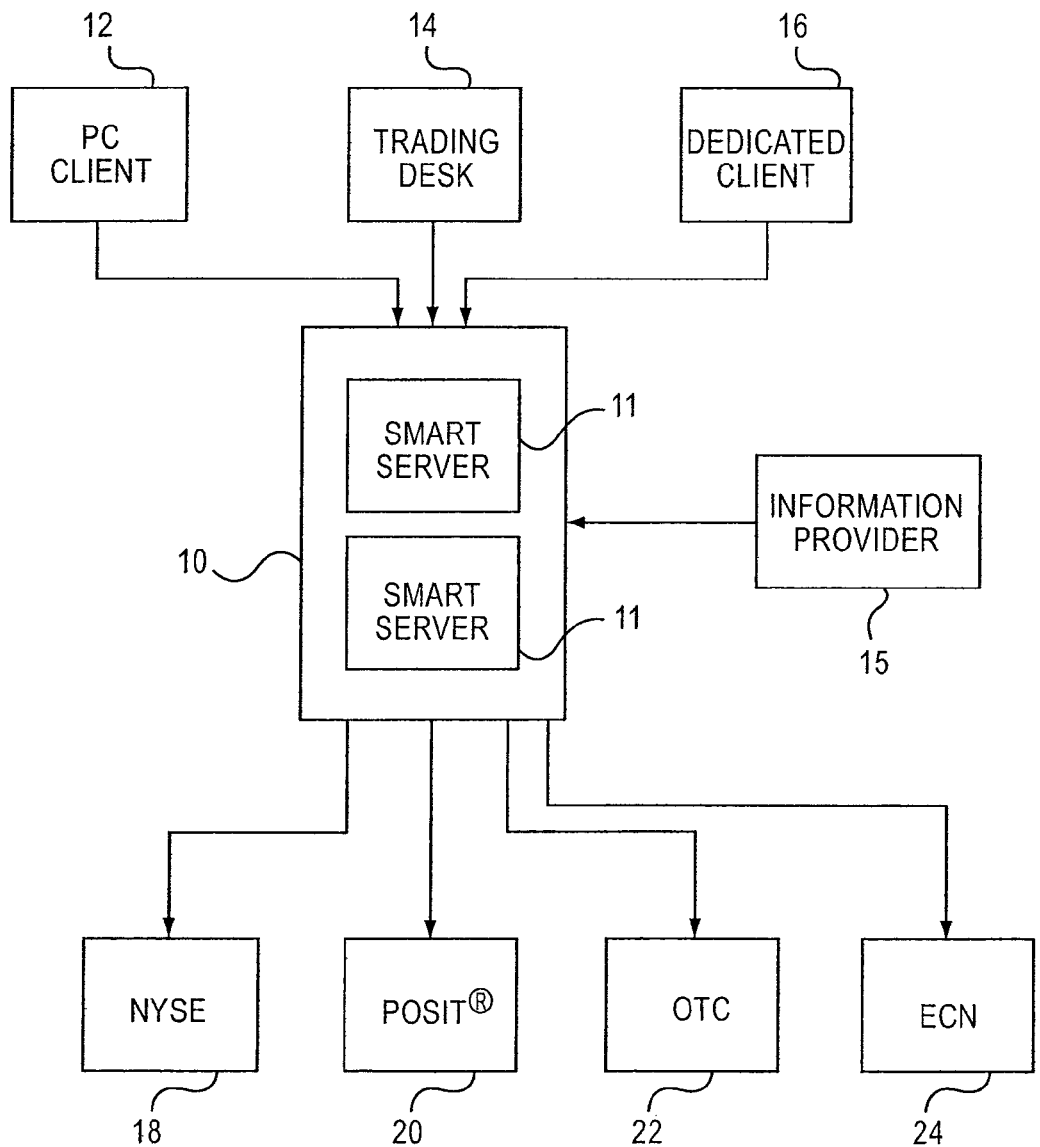
FIG. 1 is a block diagram of a system for forecasting transaction costs for a proposed trade execution according to a specific trading strategy and according to a preferred embodiment of the invention.

Referring to FIG. 1, one or more transaction cost optimization servers 11 is provided on a communication network 10. The network 10 may be a public network or a private dedicated network. A server 11 is programmed with transaction cost estimation and optimization algorithms, and has access to various trading mechanisms or exchanges through the network 10, such as the New York Stock Exchange (NYSE) 18, the POSIT® intra-day equity matching system 20, the over-the-counter (OTC) market 22 (including, but not limited to, the NASDAQ stock market), or an electronic communications network (ECN) 24.

According to preferred embodiments of the present invention, the server 11 is electronically accessible directly by customers through the network 10. This access can be either through a personal computer (PC) 12 or a dedicated client terminal 16 which is electronically connected to the network 10 such as via the Internet or a dedicated line. Alternatively, clients could interact with the network via a trading desk 14 through which a customer can perform a transaction cost analysis. Particularly, the trading desk is a user interface that provides comprehensive agency trading services utilizing multiple liquidity sources.

According to preferred embodiments of the present invention, a number of different servers 11 may be provided on the network, with each server 11 running a transaction cost analysis program and having access to various appropriate trading forums and various electronic communication networks. A customer may submit a proposed portfolio trade execution for analysis with any specific one of the servers 11. A server 11 receives the proposed portfolio trade execution from the customer over the network 10 and processes and analyzes the execution according to the user-selected preset trading strategy algorithm being run by the server 11. The server 11 then executes the transaction cost analysis and optimization and preferably transmits the execution results to the customer in real time.

By providing such servers, a significant advantage over the prior art system (where analyses are executed manually by human traders or by computer using outdated information) is achieved. The server 11 can handle much more complex trades including trades involving large volumes and many more different equities. Additionally, the server 11 can provide expert results for a very large number of equities, unlike a trader who may be able to concentrate on or follow only a relatively small number of equities at once. A server according to the present invention has a further advantage over a human trader in that it can be electronically connected via the network 10 to a real time market information provider 15 as well as sources providing historical and derived market data such that it can receive and process multiple indicators on a continuous basis. Further, multiple requests for transaction cost analysis having different desired trading strategies (e.g., levels of risk aversion) can be simultaneously executed by routing proposed portfolio trade orders to the appropriate server 11.

Figure 2:
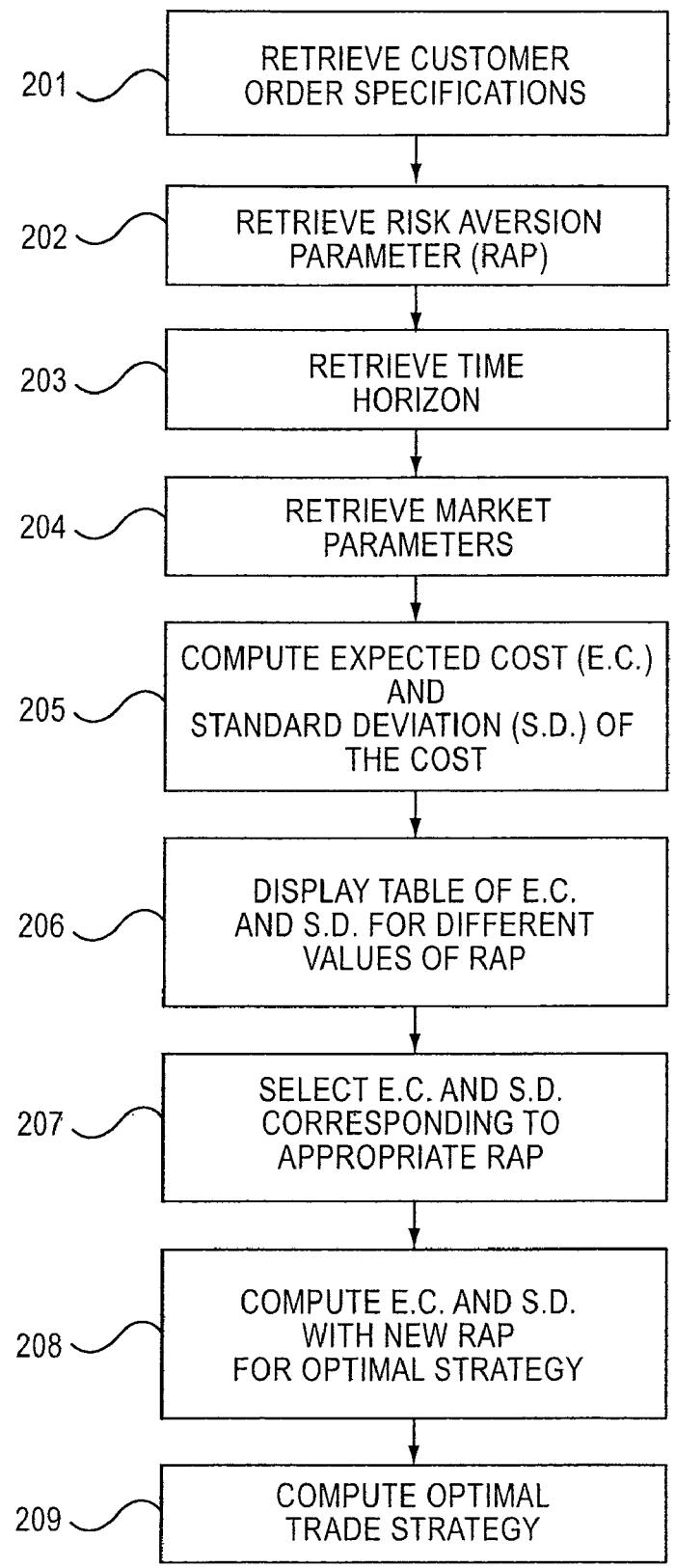
FIG. 2 is a flow diagram of an exemplary system for estimating and optimizing the transaction costs of a trade execution carried out under a specific trading strategy according to the invention.

FIG. 2 illustrates one example of a system for estimating and optimizing the transaction costs of a trade execution according to the invention, wherein transaction costs are estimated according to a transaction cost estimation and optimization algorithms. The ACE algorithms are programmed into a server 11, and customers wishing to execute the ACE transaction cost estimation and optimization for proposed portfolio trades input requests for analyses and transmit them directly to the ACE server. The ACE server performs one or more transaction cost analyses (TCA).

According to this method, at step 201 the customer's order specifications are retrieved. For example, a customer may wish to sell 1 million shares of security XYZ. At step 202, the customer specifies (and inputs) a value for the risk aversion parameter (RAP). If no value is retrieved, the program sets the default value to 0.4. At step 203, the customer specifies the optimal trade time horizon, e.g., selling 1 million shares of XYZ security over 7 days. At step 204, the program retrieves market parameters, e.g., security master information (i.e., ticker symbol, cusip, exchange) closing price, volatility, and trading volume. At step 205, the program calculates estimations for the customer's set of parameters and system inputs based on the most recent market data. At step 206, the results are displayed to the customer as a table of expected costs and standard deviation of costs for different RAP values. At step 207, the customer selects a pair of values (EC and SD) from the table that are most appropriate in the particular case, and a value of RAP corresponding to the chosen pair of values. At step 208, the customer inputs the new RAP value (while maintaining the other parameters) to see a new set of expected cost and cost standard deviation. This establishes a range of cost estimates. At step 209, the program calculates (and displays) the optimal trade strategies based on the customer's inputted parameters, from which the customer may choose the strategy that best fits the customer's particular situation.

As can be seen from FIG. 2, The agency cost estimator (ACE) method and system is a computer-executed set of statistical models that forecasts the transaction costs of a trade execution. In ACE, cost is measured as the difference between the average execution price and the prevailing price at the start of order execution.

ACE can be used to:

Provide estimates of the price impact cost for any specified trading strategy

Form pre-trade cost benchmarks to evaluate the execution performance of traders and brokers, calibrated to a variety of common pre-specified strategies (constant fraction of average daily volume, VWAP-strategy) or any arbitrary user-defined strategy Evaluate the costs of trading as a function of the desired trading strategy of a trader Fine tune a trading strategy in terms of trading horizon and aggressiveness Recommend an optimal trading strategy that balances execution costs against the uncertainty in the realized cost of trading Generate a confidence interval which contains the realized cost Unlike many other conventional products, ACE is a dynamic model that recognizes that a trader will typically break an order into several trades to minimize execution costs.

Three significant features of ACE are as follows:

ACE recognizes that agency traders incur price impact because a trade moves the prevailing price when he/she executes a trade. It is the cost of demanding liquidity. Price impact has both permanent and temporary components. The permanent component is information based; it captures the persistent price change as a result of the information conveyed to the market that the trade occurred. The temporary price impact is transitory in nature; it is the additional liquidity concession to get the liquidity provider to take the order into inventory. The permanent impact means that the first trade of a multi-trade order will affect the prices of all subsequent sub-blocks sent to the market. Modeling this dynamic link is a key element of computing the price impact for a program of trades spread over time.

ACE also recognizes that there is no such thing as "the" cost estimate for a trade. In reality, cost is a function of the trader's strategy. The more aggressive the trading strategy, the higher the cost. Aggressiveness can be measured in terms of how rapidly the trader wants to execute the trade given the trade's size relative to normal liquidity. Thus, the ACE estimate is predicated on a particular trading strategy. ACE 2.0 recognizes several benchmark strategies and also allows the user to specify any arbitrary trading strategy. These include VWAP (a participation strategy that mimics the volume pattern in the security based on historical data), uniform (a flat or linear strategy), the optimal ACE strategy (described below), or any user-specified custom strategy. ACE can also be used to develop an "optimal strategy" that balances price impact costs against opportunity costs. Opportunity costs are largely due to price volatility and create uncertainty in the realized cost of trading as they do for the realized return of investing. When executing an agency order the balance between price impact and opportunity cost is chosen on the basis of the motivation for the order, which ultimately comes from the investment manager. Passive managers are mainly concerned about price impact. Growth or momentum managers are more worried about opportunity costs. We refer to the investment manager's sensitivity to opportunity costs as his/her risk aversion, just as is done for an investment manager's sensitivity to investment risk. The ACE model estimates the expected cost and the standard deviation of the cost of the agency trading strategy that optimally balances the tradeoff between paying price impact and incurring opportunity costs for a given level of risk aversion and trading horizon. The user can either define the weight on risk directly or by telling ACE the fraction of the order to be completed by mid-horizon. It does so by expressing the trading problem as a multi-period stochastic control problem. It then calculates the expected cost and the standard deviation of the cost for the resulting optimal strategy. This strategy is recommended for traders who want to weight the opportunity cost associated with trading over a long interval of time.

The ACE model is not a purely econometric model. Rather, it is a structural model that uses parameters estimated from econometric models of agency trade execution. In particular, ACE relies on stock specific econometric models of volatility and price impact. ACE uses market parameters as an input, including security master information (ticker, cusip, exchange), closing price, volatility, trading volume, bid/ask spread, distribution of trading volume and volatility by 30 minute intraday bin (based on latest available market data for several months). We estimate volatility as the standard deviation of returns for the most recent 60 trading days, volume as the 21-day median dollar volume, and bid/ask spread as the 5-day average time and size weighted bid/ask spread. These approaches allows us to take into account the latest trends in stock price behavior and at the same time to filter out fluctuations, which often are generated by market news, earnings announcements and other factors.

ACE model is a tool to reliably forecast transaction cost and statistical characteristics of this forecast for a scenario selected by a user. The ACE estimate depends on the user's strategy and trading aggressiveness. Further, the model is a dynamic one that assumes trading through market orders. It is not intended to be a model of upstairs trading costs or block pricing. The agency cost estimator and optimizer of the present invention is unique in that it allows the user to specify a particular trading style as the basis for estimation of costs.

An important aspect of the ACE model and system is that it can be used to recommend a particular trading strategy for a user. ACE balances two considerations: expected cost and standard deviation. The ACE model estimates the expected cost ("EC") and the standard deviation ("SD") of the cost of the agency trading strategy that optimally balances the tradeoff between paying price impact (in consideration for liquidity demand) and incurring opportunity costs for a user-specified weights on cost and risk and trading horizon. It does so by expressing the trading problem as a multi-period stochastic control problem. It then calculates the expected cost and the standard deviation of the cost for the resulting optimal strategy.

The execution cost is a signed (i.e., positive or negative) difference between the value of a security or portfolio of securities at the beginning and the end of the specified trading horizon. The ACE model estimates the expected cost of the agency trading strategy as follows:

The trading horizon is first divided into a number of bins, or time periods of equal duration. For example, in the U.S. market, ACE considers thirteen bins of 30 minute duration per trading day. However, any number of bins of any duration may be used so long as the bin parameters are appropriately configured for the chosen duration. The trading horizon may consist of several trading days, with an arbitrary starting bin in the first day and ending bin in the last day. The trade order is defined by its trading horizon, trade side (buy or sell), size and trading strategy (sequence of share quantities per bin for a given trading horizon). Trading of all share quantities specified for each bin is assumed to be completed within the respective bin.

The ACE model distinguishes between market price, defined as a security mid-quote price or average of bid and ask quote prices, and an average execution price for which a given bin share quantity was executed. The average execution price includes temporary price impact and average price improvement. A temporary price impact represents a liquidity concession made to induce the taking of an order into inventory, typically half the prevailing bid-ask spread (net of any price improvement). A permanent price impact is the effect on market price (as contrasted with trade price) caused by the execution of the trade. Large size trades affect market price not only within the execution period, but have a persistent effect to the end of the trading day.

Price improvement is a price received that is better than the prevailing prices (i.e., bid for a sell order or ask for a buy order). Generally, all buyer/seller initiated orders are expected to execute at the prevailing ask/bid quote price. However, a buyer/seller often may receive a better execution price than the prevailing ask/bid quote price at the time the order was placed, due to sudden and unpredictable market moves. Such better received price is defined as a price improvement.

For any given security, volume and price volatility vary significantly by bin within the same trading day. The volume and volatility distributions by bin are determined statistically and taken into account when estimating transaction cost and generating an optimal strategy. While volume and volatility distributions for a particular stock ideally should be used when estimating transactions costs for that stock, research has demonstrated that such distributions may be unstable, even for very liquid stocks, because of market noise. Consequently, as an alternative aggregated bin distributions of a larger number of stocks may be used. Such aggregated distributions have been shown to be much more stable.

The total realized transaction cost C can be defined as $$C = \sum_{i=1}^{T} [C_i(n_i) + (\alpha + \epsilon_i \sigma + T_i n_i) x_i] \quad (1)$$

where $n_i$=total number of shares traded on day i
$\alpha$=expected daily price change
$\epsilon_i$=random price disturbance for day i
$\sigma$=standard deviation of daily price change
$T_i$=linear coefficient for price impact persistence after trade on day i
$x_i$=residual at the end of day i The mean or expected cost EC may be considered as simply an average value of total cost if the execution could be repeated many times, since the total execution cost C is a stochastic or random variable rather than a deterministic value or number. This is so because total execution cost is subject to a large number of unknown factors, including uncertain behavior of other market participants, market movements related to macroeconomic or stock-specific factors, etc. EC may be defined as $$EC = \sum_{i=1}^{T} [EC_i(n_i) + (\alpha x_i + T_i n_i x_i)], \quad (2)$$

where $$EC_i(n_i) = \sum_{j=1}^{N} [C_i(n_{i,j})^2 + (\alpha_j + \gamma_i n_{i,j}) \tilde{x}_{i,j}] + (\alpha_0 + J) n_i,$$

$\alpha_j$=standard deviation of price change in bin j
$\alpha_0$=standard deviation of price change between closing and opening
$\gamma_j$=linear coefficient for price impact persistence after trade in bin j
$n_{i,j}$=shares traded in bin j of day i
J=half bid-ask spread
$\tilde{x}_{i,j}$=residual for the day after bin j of day i
N=number of bins in trading horizon In the first use of ACE, computing a cost of a pre-specified trading strategy, equations (2) and (3) are used to generate a predicted cost. Specifically, given a pre-specified distribution of shares across the trading horizon, by bin, given by {n}, we compute the expected price in each bin using (3) and then sum across bins (weighting by ni) using (2) to get total cost. A proprietary daily risk model is used to get a forward looking estimate of the variance of cost, allowing for the possibility of price movements across bins.

In the second use of ACE, the optimal trading strategy, denoted by {n*}, is computed by solving a particular optimization problem that balances expected cost against variance. The optimization problem of ACE is then given as:

$$PD=\min\{(1-\lambda)EC+\lambda^*\text{Var } C\},$$

where $\lambda$ is a non-negative parameter called the risk aversion parameter (or weight on opportunity cost), and Var C is the variance or square of the standard deviation of cost C. The weight on opportunity cost is typically input by the user and is a number between 0 and 1; very low weights correspond to styles of trading where opportunity costs are not a significant consideration (e.g., a value trader without information), whereas high values correspond to aggressive trading styles (e.g., a trader who is concerned about adverse price movements) where trading is accomplished rapidly.

The ACE optimal strategy is a solution of the optimization problem. Note that ACE requires the user to select a value of risk aversion parameter that reflects the user's risk tolerance level, in addition to trading horizon for the specific transaction to be executed. The risk aversion parameter does not have an absolute value, i.e., a value which represents a user's risk aversion level for one particular scenario does not necessarily represent the same level for another one. Rather, RAP identifies a scenario within the same order. Because RAP doesn't have an absolute value, two parameters must be taken into account for each scenario under consideration: the expected cost (EC) and the standard deviation (SD) of a trading strategy. For an aggressive strategy, expected cost is relatively higher, but standard deviation is lower. Therefore, on average, expected cost is slightly higher than for less aggressive strategies, but the level of uncertainty is lower, that is, the range of possible values of cost around expected cost is somewhat narrow.

The ACE model and system does not suggest aggressive or passive strategies. Rather, ACE provides optimal strategies and corresponding parameter forecasts for all different scenarios and allows a user to select a scenario which best fits the trader's particular situation. For example, if it is more important for a trader not to exceed a certain reasonable level of transaction cost rather than minimize the average cost (e.g., if a trader is penalized for under-performance and not credited for over-performance), it is suggested to use more aggressive strategies. For each value of risk aversion, ACE will calculate expected cost and standard deviation of expected cost, and will generate an optimal trade execution strategy for the selected trading horizon.

In contrast to the prior art, the ACE model is not a purely econometric model, but rather a structural model that uses parameters estimated from econometric models of agency trade execution. In particular, the ACE model relies on stock-specific econometric models of volatility and price impact. ACE uses market parameters as an input, including security master information (ticker, cusip, exchange), closing price, volatility, trading volume, bid/ask spread, distribution of trading volume and volatility by 30 minute intraday bin.

The ACE model also accounts for market volatility. The ACE model estimates volatility as the standard deviation of price returns for the most recent 60 trading days, volume as the 21-day median dollar volume, and bid/ask spread as the 5-day average time and size weighted bid/ask spread. These approaches take into account the latest trends in stock price behavior, and at the same time filter out fluctuations, which often are generated by market news, earnings announcements and other factors.

The ACE model and system considers specific effects from calendar milestones, such as the end of a month, quarter or year, or the effect of a holiday or Monday, when volatility is usually higher as a result of news disseminated from a company announcement or from over the weekend.

A unique aspect of the present invention is the model's consideration of single stocks as a single name case. Particularly, the single name case considers a trade for a single stock, in isolation from any other orders the user may be executing at the same time. The inputs for the single name case may include, inter alia, ticker symbol (or cusip), side (buy or sell), number of shares to trade, trading horizon, risk aversion parameter, and starting bin.

The ACE model also considers the trading horizon in analyzing a proposed portfolio trade execution. If there is no requirement on selection of trading horizon for an order, it may be selected as an optimal one. An optimal trading horizon is defined as:

$$\min\{k=1, 2, \ldots : p66_k/p66_{k+1} < 1.05\},$$

where $p66_k$—66%-percentile of cost for k-day trading horizon.

For example, if a trader trades 1 million shares of security XYZ and the ACE system sets the optimal horizon to be equal to 6, it means that for a 7 day trading horizon the 66%-percentile of transaction cost drops less than 5% of its value, compared against the 6-day horizon. For fewer than 6 days, it drops more than 5%, if comparing 66%-percentile of transaction cost for any two consecutive days. This definition, however, does not restrict users who would prefer another optimal trading horizon. They may run the ACE program for several consecutive numbers of days and apply their own definition.

EXAMPLE 1

Executing a Single Name Case.

In this example, the system and method considers a trade for a single stock, in isolation from any other orders the user may be executing at the same time. The user (trader) may access the computer program through a user interface (UI), and the program executes according to the following steps:

1. The user selects all parameters according to the trader's order specifications and any reasonable value of RAP. By default, 0.4 is used as the value for RAP. In most cases, this particular value suggests a moderately aggressive strategy, which is typically appropriate for an initial run. The user then selects the "Calculate" command, e.g., by clicking on a "calculate" button on the user interface. The software program will display ACE estimates for the user's set of parameters and system inputs based on the most recent (e.g., real time) market data.

2. The user accesses the Risk Frontier screen. A table is presented with values of EC and SD for different values of RAP. The user selects a pair of values (EC, SD) from the table that are the most appropriate in the particular case, and a value of RAP corresponding to the chosen pair of values. The user may change the values for Lower and Upper Limits and Step. The user may select the Draw Chart option (e.g., a button or icon) to select an appropriate chart to graphically represent the range of values.

3. After selecting the most appropriate pair (EC, SD) and corresponding RAP value, the user may return to the Cost Estimates screen. The user inputs the selected RAP value and then selects the "Calculate" button.

4. The user may go to the Trade Strategy screen to view the optimal trade strategy. The user may select the chart button to view a distribution by interval within a selected day or by trading day, if the trading horizon consists of more than one trading day. The user may go to the Shares Frontier screen to change the size of the order to study how it will affect the ACE cost estimation estimates. The user may change the values for Lower and Upper Limits and a Step, and then select the Draw Chart button to choose an appropriate range of share values.

EXAMPLE 2

Executing a List Case.

In this example, the system and method considers a trade for a list of stocks in a portfolio. The list case is designed for portfolio trading. In the list case, the ACE method and system includes a risk model, which takes into account correlation between price movements for all stocks in a portfolio. The list case has the same inputs as the single name case, except it uses a portfolio list instead of a security symbol. As with the single name case, the user (trader) may access the computer program through a user interface, and the program executes according to the steps outlined in Example 1.

The user may obtain estimates for a default set of parameters and may consider different values of RAP from the Risk Aversion Frontier screen in the same fashion as was performed in the single name case. The user may select the appropriate set of values for a particular case value. Trade horizon also can be adjusted as desired.

The ACE model and system generates a pre-trade report as part of a preliminary analysis of a proposed portfolio trade. The pretrade report is designed to run a list of trades as a set of separate "stand-alone" trades. The pre-trade report includes a list of single name cases. Entering a list of trades is performed in the same manner as the list case in Example 2.

As with the other cases, in the pre-trade report case, a user may select an appropriate value of RAP, which should be the same for all trades in the list.

Portfolio Characteristics Report

The ACE model also can generate a portfolio characteristics report that describes the risk characteristics of the portfolio. The model uses a propreitary daily risk model to construct forecasts of the return volatility of the portfolio (the standard deviation of the return of the portfolio on a daily basis, relative to a user-selected benchmark portfolio such as the S&P 400, etc.) and risk characteristics. In particular, the report shows the percentage of the portfolio's value by sector (e.g., raw materials, etc.) as well as select statistics. See attached screen shot.

Optimization of Transaction Cost

In addition to portfolio transaction cost estimation, the ACE method and system comprises an algorithm that calculates an optimal trade strategy that minimizes transaction costs. As described above, the invention generally comprises two parts: A first part based on price impact and volatility models that allows a user to obtain transaction cost estimates for any given strategy, and a second part comprising an algorithm that builds an optimal strategy based on the results of the first part.

After randomly simulating millions of strategies and for each strategy calculating the value of the criteria based on the expected cost and the standard deviation of the cost for a strategy, an optimal strategy with the lowest value of the criteria was selected. That is, by performing a significant number of simulations, a very close approximation of the optimal strategy provided by ACE was discovered. Such a simulation was performed, and it demonstrated that ACE method and system provides an optimal trading strategy. In fact, after millions of repetitions, no strategy was obtained that provided a lower value of the criteria than the ACE strategy provided.

An optimal strategy is a subject of model definitions and assumptions. The ACE optimal strategy is "optimal" only for a user's specific criteria, e.g., level of risk aversion, and under the assumption that expected cost and standard deviation are estimated correctly. The correctness of the assumptions was tested and verified using historical order execution data.

The validity of the ACE model was proven by testing how well the model estimated the expected cost and the standard deviation of the cost for a set of orders traded consistently using a fixed strategy. The test validated the estimated daily volatility as well as the estimated coefficients for the price impact functions. For the order execution history, data was collected from ITG Inc.'s VWAP (Volume Weighted Average Price) SmartServer because the orders are completed in a systematic way by always trading a given fraction of the target in every half-hour bin of the day. The data comprised a set of all orders executed through the VWAP server during a period of 10 months. For each order, the number of shares traded during each half-hour bin and the average execution price was obtained. Certain orders were excluded, e.g., orders that constituted less than 1% of the 21-day median volume, orders that had short sales, or for which there was a separate, simultaneous order in the same security. The sample size comprised 11,852 orders. The data set covered 1,304 exchange-listed securities and 49 NASDAQ securities.

The transaction cost per share was defined as the difference between the average execution price and the price available at the beginning of the trading period (the benchmark price). The sign (positive or negative) of the difference was used so that a positive value represented a bad outcome. For each order t in the data set, the realized transaction cost $x_t$ is computed. Also calculated, using the parameters of the ACE model, is the estimated expected transaction cost $m_t$ and the estimated standard deviation of the cost $s_t$. The variable $z_t = (x_t - m_t)/s_t$ is referred to as the normalized excess cost. The random variable $z_t$ is expected to have the mean of 0 and the standard deviation of 1. A t-test is performed for the hypothesis that the mean of $z_t$ is 0 assuming that standard deviation is unknown, and a chi-square test for the hypothesis that the standard deviation of $z_t$ is 1 assuming that the mean is unknown.

In general, statistical tests are used under the same assumptions that samples they are run on have been built. ACE assumes that the expected daily return, called a for all stocks, is 0. Standard deviation is higher for months when the market was very volatile (see Table 1). However, for a relatively stable market, positive and negative effects will compensate each other, and it is appropriate to use the sample to test at least the mean of the normalized excess cost. From this perspective, the test is considered a benchmark of the model's applicability. Tests were performed for the entire order data set and several subsets of the data. The data was divided into subsets, e.g., by month, trade share volume relative to 21-day median volume, 21-day median volume, 5-day average spread, 5-day average spread relative to price, volatility (60-day standard deviation) of daily percentage price returns and share price.

The results are provided in the tables below. The "Mean" and "StandDev" in the tables represent the mean and standard deviation of the normalized excess cost, respectively.

TABLE 1

| | T-Test Results by Month | | | | | | | | | | |
|---|---|---|---|---|---|---|---|---|---|---|---|
| month | December 1998 | January 1999 | Febuary 1999 | March 1999 | July 1999 | August 1999 | September 1999 | October 1999 | November 1999 | December 1999 | all |
| Number of orders | 1,150 | 884 | 1,611 | 1,834 | 975 | 1,020 | 942 | 900 | 1,146 | 1,390 | 11,852 |
| Mean | 0.001 | −0.016 | 0.007 | −0.003 | −0.006 | −0.029 | 0.010 | 0.011 | −0.018 | −0.003 | −0.004 |
| p-value | 0.979 | 0.602 | 0.811 | 0.906 | 0.862 | 0.330 | 0.831 | 0.818 | 0.596 | 0.906 | 0.680 |
| StandDev | 0.773 | 0.888 | 1.120 | 1.020 | 0.992 | 0.943 | 1.393 | 1.432 | 1.168 | 1.127 | 1,093 |

Overall, the mean of normalized excess cost is very close to the desired value of zero. Thus, on average the ACE model accurately forecasted trading costs for the sample. Moreover, the relatively high p-values mean that one cannot distinguish, in a statistical sense, the small values from zero.

TABLE 2

T-test Results by Percentage of 21-day Median Daily Share Volume

| % | 1-4% | 5-9% | 10-14% | 15-19% | 20%+ | all | 5%+ |
|---|---|---|---|---|---|---|---|
| Number of orders | 8,857 | 2,434 | 422 | 112 | 27 | 11,852 | 2,995 |
| Mean | −0.006 | −0.002 | 0.011 | 0.031 | −0.069 | −0.004 | 0.0007 |
| p-value | 0.62 | 0.94 | 0.84 | 0.76 | 0.79 | 0.68 | 0.97 |
| StandDev | 1.088 | 1.117 | 1.078 | 1.093 | 1.281 | 1.093 | 1.111 |

Even though the mean actual cost increases with trade size (as a multiple of the 21-day median trading volume), the mean normalized excess cost stays close to 0. This indicates that the model is forecasting the correct magnitude of the cost across orders of widely varying liquidity. The p-value for orders of 1-4% of the 21-day median daily share volume is the lowest among all subgroups. It stays inline with the fact that the influence of other factors for price movement compared to the influence of the order execution is relatively weaker for small trades than for relatively large trades. For example, considering only samples for orders of the magnitude higher than 4% of the 21-day median trading volume (see last column of the Table 4), the estimated mean equals 0.0007 and the p-value is 0.97. Tables 3-7 present the results of T-tests for other subsets of data.

TABLE 3

T-test Results by 21-Day Median of Daily Share Volume

| volume (in thousands) | <50 | 50-100 | 100-250 | 25-500 | 500-1,000 | >1,000 | all |
|---|---|---|---|---|---|---|---|
| number of orders | 1,095 | 1,319 | 3,237 | 2,913 | 1,798 | 1,490 | 11,852 |
| Mean | −0.422 | 0.018 | 0.006 | 0.005 | 0.010 | 0.005 | −0.004 |
| p-value | 0.19 | 0.60 | 0.76 | 0.80 | 0.71 | 0.87 | 0.68 |
| StandDev | 1.055 | 1.260 | 1.048 | 1.083 | 1.098 | 1.074 | 1.093 |

TABLE 4

T-test Results by Absolute Value of Spread

| spread (in cents) | Lower than 10 | Between 10 and 13 | Between 14 and 16 | Between 17 and 20 | Between 21 and 30 | higher than 30 | all |
|---|---|---|---|---|---|---|---|
| Number of orders | 1,448 | 3,617 | 3,610 | 2,264 | 840 | 73 | 11,852 |
| Mean | 0.007 | 0.000 | −0.006 | 0.000 | −0.345 | −0.135 | −0.004 |
| p-value | 0.80 | 1.00 | 0.76 | 0.98 | 0.33 | 0.30 | 0.680 |
| StandDev | 1.102 | 1.084 | 1.162 | 1.010 | 1.030 | 1.093 | 1.093 |

TABLE 5

T-test Results by Spread Relative to Price

| Spread to price % | <0.2% | 0.2%-0.3% | 0.3%-0.4% | 0.4%-0.5% | 0.5%-0.7% | 0.7%-1% | >1% | all |
|---|---|---|---|---|---|---|---|---|
| Number of orders | 636 | 2,269 | 2,597 | 2,036 | 2,465 | 1,174 | 675 | 11,852 |
| Mean | 0.052 | 0.005 | −0.018 | −0.000 | −0.009 | −0.009 | −0.022 | −0.004 |
| p-value | 0.21 | 0.80 | 0.40 | 1.00 | 0.68 | 0.83 | 0.60 | 0.680 |
| StandDev | 1.043 | 1.013 | 1,089 | 1.041 | 1.089 | 1,342 | 1.110 | 1.093 |

TABLE 6

T-test Results by Volatility Relative to Price

| Volatility to price percentage | <1% | 1-2% | 2-3% | 3-4% | 4-5% | >5% | all | <50 | 50-100 | 100-250 | 25-500 | 500-1,000 | >1,000 | all |
|---|---|---|---|---|---|---|---|---|---|---|---|---|---|---|
| Number of orders | 270 | 5,436 | 4,527 | 1,314 | 240 | 65 | 11,852 | 1,095 | 1,319 | 3,237 | 2,913 | 1,798 | 1,490 | 11,852 |
| Mean | −0.016 | −0.005 | 0.004 | −0.021 | −0.010 | −0.086 | −0.004 | −0.422 | 0.018 | 0.006 | 0.005 | 0.010 | 0.005 | −0.004 |
| p-value | 0.82 | 0.75 | 0.80 | 0.46 | 0.86 | 0.34 | 0.680 | 0.19 | 0.60 | 0.76 | 0.80 | 0.71 | 0.87 | 0.68 |
| StandDev | 1.177 | 1.166 | 1.037 | 1.005 | 0.877 | 0.709 | 1.093 | 1.055 | 1.260 | 1.048 | 1.083 | 1.098 | 1.074 | 1.093 |

TABLE 7

T-test Results by Price

| Price (in dollars) | 5-15 | 15-30 | 30-50 | 50-100 | >100 | all |
|---|---|---|---|---|---|---|
| Number of orders | 1,124 | 4,134 | 3,938 | 2,467 | 189 | 11,852 |
| Mean | −0.010 | −0.004 | −0.009 | −0.002 | 0.093 | −0.004 |
| p-value | 0.78 | 0.84 | 0.59 | 0.93 | 0.17 | 0.680 |
| StandDev | 1.170 | 1.142 | 1.064 | 1.032 | 0.923 | 1.093 |

The results strongly validate the parameters behind the ACE model. The p-value is relatively low only for the most illiquid stocks, in terms of extreme values of price, median volume or volatility. However, it is never low enough to reject the null hypothesis that the normalized excess cost is different from 0.

As can be readily seen by an person of ordinary skill in the art, in alternative embodiments of the present invention proposed trade executions can be automatically transferred within the network from one server operating according to a first trade strategy algorithm to another server having a second different trade strategy algorithm.

The invention being thus described, it will be apparent to those skilled in the art that the same may be varied in many ways without departing from the spirit and scope of the invention. Any and all such modifications are intended to be included within the scope of the following claims.

What is claimed is:

1. A method for estimating transaction costs of a security trade execution according to a trading strategy selected by a user, comprising the steps of:
   providing a server connected to a communication network, said server being programmed with a specific strategy transaction cost optimization algorithm;
   receiving at said server over said network data defining parameters of a proposed trade execution from a user, and data specifying a user-selected trading strategy; and
   estimating the transaction costs of the received proposed trade execution based on the user-selected trading strategy and market data, and recommending actions determined by said specific strategy transaction cost optimization algorithm that minimize said transaction costs under said user-selected trading strategy, whereby a user may minimize transaction costs by taking said actions in executing said trade;
   wherein, said user-selected trading strategy may be selected from among a plurality of predefined trading styles, or may be specifically defined by said user.

2. The method of claim 1, wherein the method further comprises providing an estimation report to the customer over the network.

3. The method of claim 1, wherein an adjustment factor adjusts for trade difficulty and market conditions to allow for an accurate comparison of trades performed under different circumstances and trading conditions.

4. The method of claim 1, wherein said adjustment factor provides an expected trading cost for each security for each day based on a statistical analysis of measures of trade difficulty.

5. The method of claim 1, wherein a plurality of servers are connected to a plurality of customers over a communication network, and customers enter their risk aversion profile and hypothetical trade order characteristics through the communication network to the server associated with transaction cost optimization.

6. The method of claim 1, comprising the further step of:
   providing a user interface to allow a user to identify relevant data and trends in a dataset, and to locate factors that affect transaction performance.

7. The method of claim 6, wherein a user is able to change a subset of the dataset under consideration and perform real-time analytic calculations without additional pre-processing.

8. The method of claim 6, wherein a user may add new user aggregates, without additional pre-processing.

9. The method of claim 1, wherein the server is adapted to provide a direct interface to a securities price database to enable the display of transaction cost analysis results in real-time.

10. The method of claim 1, wherein the transaction cost algorithm allows for intra-day calculation of price-based benchmarks.

11. The method of claim 5, wherein each server accepts proposed orders and other customer input data directly over the communication network from customers wishing to estimate the transaction costs of one or more securities to be traded according to the particular trading strategy set by the customer, and all servers have access to multiple trading destinations, access to real-time and historical market data, and real-time analytic data, and each server has access to other servers on the communication network such that market and historical data, or compilations of data, can be exchanged between the servers, and the servers can interoperate more efficiently.

12. A method according to claim 1, wherein said transaction cost estimation takes into account temporary price impact, permanent price impact, and price improvement factors.

13. A method according to claim 1, wherein said transaction cost estimation recommends specific share quantity trade executions for each of a number of time duration bins according to the trading strategy selected by the user, to optimize transaction costs under said selected trading strategy.

14. A system for estimating and optimizing transaction costs of proposed execution trades of securities according to a risk value selected by a user, comprising:

a plurality of servers, each server being programmed with a specific transaction cost estimation and optimization algorithm, receiving from said user data specifying parameters of a proposed trade order and estimating the transaction costs of the received proposed trade execution based on the user-selected risk value and market data, and recommending actions determined by said specific strategy transaction cost optimization algorithm that minimize said transaction costs under said user-selected risk value, whereby a user may minimize transaction costs by taking said actions in executing said trade;

said plurality of servers being connected to a plurality of clients over a communication network, wherein a user enters at a client a selected risk value and data specifying parameters of a proposed trade order and transmits them from said client over said communication network to a server associated with the transaction cost estimation and optimization, and receives said estimation of transaction costs according to a selected from said server over said communication network.

* * * * *